G. H. SEYMOUR.
Car Brake.

Patented April 5, 1870.

Witnesses:
F. Lehmann
C. L. Euch

Inventor:
Geo. H. Seymour
per Alexander & Mason
Attys

G. H. SEYMOUR.
Car Brake.

Patented April 5, 1870.

Witnesses:

Inventor:
Geo. H. Seymour
Alexander Mason

United States Patent Office.

GEORGE H. SEYMOUR, OF NEWARK, OHIO.

Letters Patent No. 101,667, dated April 5, 1870.

IMPROVEMENT IN CAR-BRAKES.

The Schedule referred to in these Letters Patent and making part of the same

To all whom it may concern:

Be it known that I, GEORGE H. SEYMOUR, of Newark, in the county of Licking and in the State of Ohio, have invented certain new and useful Improvements in Car-brakes; and do hereby declare that the following is a full, clear, and exact description thereof, reference being had to the accompanying drawings and to the letters of reference marked thereon, making a part of this specification.

The nature of my invention consists in the construction and arrangement of a "lever car-brake," by the use or which the brakes will operate on both sets of trucks, or on the whole eight wheels of the car simultaneously, as hereinafter more fully described.

In order to enable others skilled in the art to which my invention appertains to make and use the same, I will now proceed to describe its construction and operation, referring to the annexed drawings, in which—

A represents the platform of the car, and
B B the wheels.

Upon the right or left hand corner of either end of the platform A, is situated a hollow upright, C, in the top of which is a windlass, the shaft of which is provided with a crank, D, ratchet-wheel, $a$, and pawl, $b$. To the windlass is attached a chain or band, which passes down the hollow upright C, through the platform A, where it is attached to one end of the lever E, which is hung in the middle from the bottom of the car.

Figure 1:
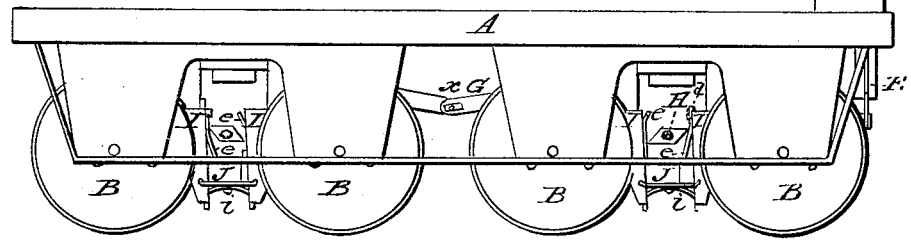
Figure 1 is a side view of the car with my brake attached.
Figure 2:
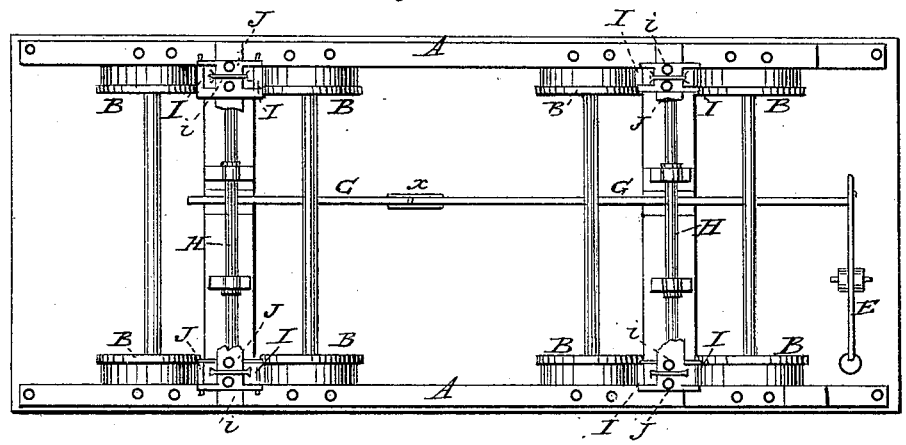
Figure 2 is a bottom view of the same.
Figure 3:
Figure 3 is a front view of one of the brake-shoes, or clogs.
Figure 4:
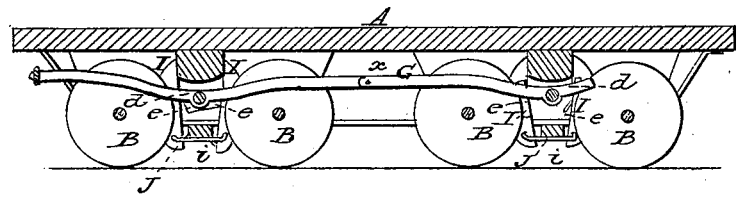
Figure 4 is a longitudinal section showing the bar G and its connections.

The other end of the lever E connects at right angles with the lever G, situated under the middle, and running lengthwise of the car. The lever G crosses and is firmly fastened to the transverse bar H, which extends out even with and half way between the wheels B B, on either side of the car, and is fastened to the truck-beam in such manner as to allow it to turn. On either end of the bar or shaft H are placed the cams $d$, constructed with beveled ends, as shown in fig. 1.

By turning the crank D the band or chain winds around the windlass, drawing up the end of the lever E, to which it is attached, and throwing down the lever G, turning the transverse bar H, and bringing the ends of the cams $d$ against the projecting bars $e$, attached to the clogs or shoes I, and thus pressing the clogs against the wheels.

The bars $e\ e$ are adjustable, being attached to the clogs by sliding into a dovetail-shaped groove, and are held in place by a screw passing through the bars and pressing against the face of the clogs. By loosening the screw the bar $e$ can be slid up or down, thus bringing it nearer to or farther from the ends of the cam $d$. The bars $e$ are of steel, and intended to spring or give under a pressure exceeding that sufficient to block the wheels.

The clogs I I are hinged to the ends of the bar J, which is firmly bolted to the truck-beam, and the clogs are held from the wheels when the brake is off by the spring $i$ pressing against their lower ends.

The levers G G extend from the transverse bars H H to half way way between the two sets of trucks, where they join, as shown at $x$, so that the power being applied at either end of the car will operate the brakes of both trucks, and will apply them to the whole eight wheels of the car simultaneously.

Having thus fully described my invention,

What I claim as new, and desire to secure by Letters Patent, is—

1. The clogs or shoes I I provided with adjustable steel-spring bars, $e\ e$, substantially as and for the purposes herein set forth.

2. The combination of the clogs I I and spring $i$, the clogs being hinged to the bar J, substantially as shown and described.

3. The combination of the levers E and G G, transverse bars H H, and cams $d\ d$, all constructed and arranged to operate substantially in the manner and for the purposes herein set forth.

In testimony that I claim the foregoing, I have hereunto set my hand this 20th day of December, 1869.

GEO. H. SEYMOUR.

Witnesses:
G. W. STADDEN,
GIBSON ATHERTON.